(12) United States Patent
Kowatsch

(10) Patent No.: US 6,928,204 B2
(45) Date of Patent: Aug. 9, 2005

(54) OPTICAL WAVEGUIDE STRUCTURE AND METHOD FOR PRODUCING SUCH A WAVEGUIDE STRUCTURE

(75) Inventor: Martin Kowatsch, Freudental (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/832,827

(22) Filed: Apr. 12, 2001

(65) Prior Publication Data

US 2001/0055457 A1 Dec. 27, 2001

(30) Foreign Application Priority Data

Apr. 13, 2000 (DE) .......................................... 100 18 283

(51) Int. Cl.[7] .................................................. G02B 6/12
(52) U.S. Cl. ............................ 385/14; 385/129; 385/49
(58) Field of Search ............................... 385/14, 39, 49, 385/129–132

(56) References Cited

U.S. PATENT DOCUMENTS

| 4,878,727 | A | * | 11/1989 | Boiarski et al. ............... 385/14 |
| 5,091,986 | A | * | 2/1992 | Arii et al. ...................... 385/48 |
| 5,526,454 | A | * | 6/1996 | Mayer ........................... 385/49 |
| 5,583,958 | A | * | 12/1996 | Yanagawa et al. ............ 385/24 |
| 5,943,455 | A | | 8/1999 | Travieso et al. |
| 6,115,515 | A | * | 9/2000 | Itoh et al. ..................... 385/14 |

FOREIGN PATENT DOCUMENTS

| DE | 42 17 553 A1 | 12/1993 |
| DE | 37 41 284 A1 | 6/1999 |

OTHER PUBLICATIONS

Funkshau 24 (1999), "Mikrostrukturen for die optische Kommunikation" by Prof. Dr. Andreas Neyer, pp. 76–78.
"Integrated Optiocas and Micro–Optics with Polymers", ed. By W. Ehrfeld et al., B. G. Teubner Verlagsgesellschaft, Stuffgart, Leipzig, 1993, pp. 211 to 218.

* cited by examiner

Primary Examiner—Rodney Bovernick
Assistant Examiner—Sung Pak
(74) Attorney, Agent, or Firm—Moser, Patterson & Sheridan, LLP

(57) ABSTRACT

An optical waveguide structure has lines (2), crossings (3), and branchings (4). In the area of the branchings (4), the waveguide structure consists of planar waveguides made of a waveguide material that is put into troughs (7) formed into a substrate (8). The waveguide material has a higher refractive index than the material delimiting the troughs (7). In the area of said crossing (3) the waveguide structure consists of fibers (5) which cross in the area of the crossings.

9 Claims, 1 Drawing Sheet

OPTICAL WAVEGUIDE STRUCTURE AND METHOD FOR PRODUCING SUCH A WAVEGUIDE STRUCTURE

This application is based on and claims the benefit of German Patent Application No. 100 18 283.6 filed 'Apr. 13, 2000', which is incorporated by reference herein.

FIELD OF THE INVENTION

The present invention relates to an optical waveguide structure, which comprises lines, crossings, branchings and/or connections. The waveguide structure has both planar waveguides and glass and/or plastic fibers. The planar waveguides consist of a waveguide material, which is put into troughs formed in a substrate. The waveguide material has a higher refractive index than the material delimiting the troughs.

The invention also relates to a multi-layer opto-electrical printed circuit board. Finally, the present invention also relates to a method for the production of an optical waveguide structure, which comprises lines, crossings, branchings and/or connections. In the method, troughs corresponding to the course of the waveguide structure are put into a substrate. Glass and/or plastic fibers are arranged in a portion of the troughs, and a waveguide material is then put into the remainder of the troughs. The waveguide material has a higher refractive index than the material delimiting the troughs.

BACKGROUND OF THE INVENTION

In recent years, it has proved to be the case that the clock frequencies of microprocessors are increasing steadily. Clock frequencies have now passed the 1 GHz mark and a further increase in the clock frequency to 5 to 10 GHz is to be reckoned with in the next few years. The system clock on circuit boards, for example a system circuit board (so-called motherboard) of a computer, lags behind the clock of the microprocessors by orders of magnitude. Although the internal clock rate of the individual semiconductor components (so-called chips) is considerably higher than the system clock on the circuit boards, the clock rate is limited by present wiring and connection technology using copper conductors. In particular, in conventional electronic assemblies the parasitic inductances and capacitances of the copper conductor paths retard the speed at which the chips can process the data internally. In wiring terms it is becoming ever more difficult with copper conductors to gain control of crosstalk due to the radiation of high-frequency signals from the conductors, which act like antennae; attenuation losses blur the rectangular pulse shapes and make detection more difficult at the other end of the connection line. The production of a circuit board which still operates smoothly at a clock rate of 4 to 8 GHz will only be possible—if at all—in several years, and only at very great expense.

One possibility for increasing the system timing on the circuit boards would be to increase the bus width and transmit the same quantity of data at a lower speed on the individual lines due to greater parallelism. However, that would not only result in a multiplication of the number of conductors, which can scarcely be accommodated on the circuit boards even now, but also in an increase in the number of I/O connections on the chips. The possibilities for increasing the connection density offered by the transition from edge board to two-dimensional contacting will soon reach their limit, however. The alternative, namely to reduce the number of terminal pins again by a higher data rate per pin, can only be managed by a new technology in internal connection systems.

Against this background, many companies and research institutes are pursuing an approach to a solution that has as its objective data transmission via planar optical waveguides, which are integrated into conventional circuit boards. Optical connections are insensitive to high-frequency and electrostatic fields; they overcome the problems of electric line attenuation at high frequencies, crosstalk and electromagnetic compatibility (EMC) incompatibilities. In addition, data rates of 10 Gbit/s and more are possible using optical connections.

In the context of the "Electrical Optical Circuit Board" (EOCB) project sponsored by the Bundesforschungsministerium (Federal Ministry for Research), a method has been developed at the Fraunhofer Institut für Zuverlässigkeit und Mikrointegration (Fraunhofer Institute for Reliability and Microintegration) (IZM) in Berlin for networking transmitters and receivers by means of optical waveguides on an opto-electrical circuit board, which method permits one of the metallizing levels of a conventional multi-layer electrical circuit board to be replaced by an optical waveguide structure. For this purpose, the waveguides, which have a typical cross-section of 60 micrometers×60 micrometers, are first hot-stamped in an organic film material using a stamping die. The troughs are then filled with a waveguide material that has a slightly higher refractive index than the film material, and then covered with a second film. This waveguide structure can then be incorporated into a circuit board. The distance between the optical waveguides is approx. 250 micrometers.

The planar waveguides produced according to the method described above have the disadvantage, however, that the optical attenuation of the waveguides for a wavelength of 850 nm lies in the range from 0.2 to 0.5 dB/cm. For wavelengths in the range from 1300 to 1550 nm, which are normal in communications engineering, the attenuation is even higher. The reason for this attenuation is to be found primarily in the absorption of the waveguide material, scattering losses due to impurities in the waveguide material and the roughness of the boundary transition between the core and sheath of the waveguide. To produce an opto-electrical circuit board for so-called backplane applications, distances of over 50 cm have to be bridged. In the case of waveguide attenuation of 0.2 dB/cm, the total attenuation of the waveguide is then over 10 dB plus the losses due to coupling to the optical components. For applications with parallel-optical-link (POL) modules, the available capacity would thus already be exceeded.

A further disadvantage of planar waveguides is manifested in additional attenuation in the area of crossings. Crossings are necessary in the case of pure distribution tasks and in more complex applications. The interruption of the waveguide sheath at a crossing leads to divergent beam guiding, due to which a portion of the light passes from a first waveguide into a second waveguide crossing the first waveguide and there passes into the sheath, i.e. it is absorbed. Light is also scattered at the edges of the waveguide in the area of a crossing, due to which a portion of the light passes from the first waveguide into the crossing second waveguide and is guided onwards there. This results in crosstalk from the first waveguide to the second waveguide. If several waveguides cross a first waveguide, the crosstalk adds up and the signal/noise ratio at the optical receiver at the end of the first waveguide is reduced.

It is known furthermore from the prior art to produce an optical waveguide structure from glass and/or plastic fibers by means of so-called optical multiwire technology. In the multiwire method, glass or plastic fibers are laid on a substrate. The glass and/or plastic fibers run over one another in the area of crossings of the optical waveguide structure, so that light cannot spread from one optical waveguide into the crossing optical waveguide. In addition, the optical attenuation of glass and plastic fibers is very low.

However, the optical multiwire method has the disadvantage that no optical waveguide structures with branchings and connections can be produced with it.

From an article "Mikrostrukturen für die optische Kommunikation" [Microstructures for optical communication] by Professor Dr. Andreas Neyer, which appeared in the journal Funkschau 24 (1999), P. 76 to 78, a so-called SIGA (silicon microstructure, plating, casting) process is known for producing an optical waveguide structure of the type stated at the beginning. The SIGA process was developed in particular for optical waveguide structures which comprise both planar waveguides and glass and/or plastic fibers, and where highly accurate alignment of the core of the optical fiber and the core of the waveguide matters. However, the question of where planar waveguides and where glass and/or plastic fibers should be used inside a waveguide structure of this kind is not addressed in this article, nor can any allusions to this question be gathered from this article.

SUMMARY OF THE INVENTION

The object of the present invention is to create an optical waveguide structure which avoids the aforementioned disadvantages of the prior art and is to be produced without great expense. In particular, the waveguide structure should have low optical attenuation and should be able to have both lines and crossings and branchings and connections.

To achieve this object, the invention proposes, starting out from the optical waveguide structure of the type stated at the beginning, that the waveguide structure be formed in the area of the branchings and connections as planar waveguides and in the area of the crossings as glass and/or plastic fibers, which cross over in the area of the crossings.

Crossing over is to be understood in the application as a whole to mean that crossing waveguides run over one another, so that crosstalk from one waveguide to a crossing waveguide is avoided. Attenuation in the crossing area can be reduced markedly by the present invention.

The optical waveguide structure according to the invention is thus produced in part by means of planar technology and in part by means of multiwire technology. The combination of planar waveguides and glass and/or plastic fibers permits the type of waveguide to be adapted to the given requirements. Different demands are made on the waveguides in particular in the area of lines, crossings, branchings and connections of the waveguide structure.

The optical waveguide structure thus has relatively low optical attenuation in the areas in which glass and/or plastic fibers are used. In the areas of the waveguide structure consisting of planar waveguides, branchings and connections can be formed easily. This permits the waveguide structure to be made large-scale and complex, which makes its use on a circuit board, e.g. a motherboard or a board for backplane applications, or in an electronic assembly of a computer, particularly interesting.

Since the width of the troughs in the area of the waveguides forms the core, the width of the troughs should be dimensioned according to the width of the core of the connected glass and/or plastic fibers (e.g. 62.5 µm or 100 µm) to achieve a good mode correspondence and to be able to avoid interface losses. To be able to achieve low attenuation, the waveguide should be surrounded by a material with a somewhat lower refractive index. Here there are two options:

The substrate, in which the grooves for the waveguides are formed, has the requisite attributes (transparency at the wavelength of the light transmitted; correct refractive index, typically around 1% lower than the refractive index of the waveguide core) and the grooves are filled with a lower cladding layer, the waveguide core layer and an upper cladding layer.

If the substrate is not transparent, the bottom and walls of the troughs must first be covered with a cladding layer, then the waveguide core layer is inserted into the troughs and finally an upper cladding layer applied. If the waveguide structure does not include any branchings, it would also be conceivable to press a type of thermoplastic optical waveguide fiber comprising the waveguide core and an outer cladding layer into the troughs.

According to a preferred form of performance of the present invention, it is proposed that the waveguide structure be formed in the area of the lines as glass and/or plastic fibers. Since the glass and/or plastic fibers have a relatively low attenuation, even a relatively large distance can thus be overcome easily, i.e. without greater losses.

The waveguide material of the planar waveguides is formed advantageously as an optical polymer. The substrate is formed preferably as an organic film material.

Furthermore, the invention proposes to put a waveguide structure according to the invention in at least one of the layers of a multi-layer opto-electrical circuit board. The electrical layers of the opto-electrical circuit board are advantageously coupled via opto-electrical transducers or electro-optical transducers to the optical waveguide structure.

As a further means of achieving the object of the present invention, it is proposed starting out from the method of the type stated at the beginning that the glass and/or plastic fibers in the area of the crossings are arranged in the troughs in such a manner that they cross in the area of the crossings, and that the waveguide material in the area of the branchings and connections is put into the troughs.

The material delimiting the troughs normally consists of the substrate of the optical waveguide structure. However, it is also conceivable for the walls of the troughs formed in the substrate to be coated or lined with a special material, the refractive index of which is lower than that of the waveguide material.

According to a preferred embodiment of the invention, it is proposed that the glass and/or plastic fibers in the area of the lines are arranged in the troughs before the waveguide material is put into the troughs.

According to a preferred further development of the present invention, it is proposed that the substrate is formed as an organic film material, into which the troughs are hot-stamped. A hot stamping die, preferably a metal die, is used for hot stamping, which die is pressed into the film and produces the troughs there.

The waveguide material is formed advantageously as an optical polymer, which is put into the troughs in a fluid state and then cured by means of ultra-violet (UV) radiation. Alternatively, the planar waveguides can also consist of thin glass, the side walls of which are structured for example by an etching process such that light rays in the inside of the waveguide are totally reflected on the side walls. The glass and/or plastic fibers are preferably glued into the troughs.

Further features, application options and advantages of the invention are yielded by the following description of practical examples of the invention, which are illustrated in the drawings. Here all the features described or illustrated form the object of the invention in themselves or in any combination, regardless of their summary in the claims or their retrospective reference and independently of their formulation or illustration in the specification or drawing.

DETAILED DESCRIPTION OF THE INVENTION

Figure 1:
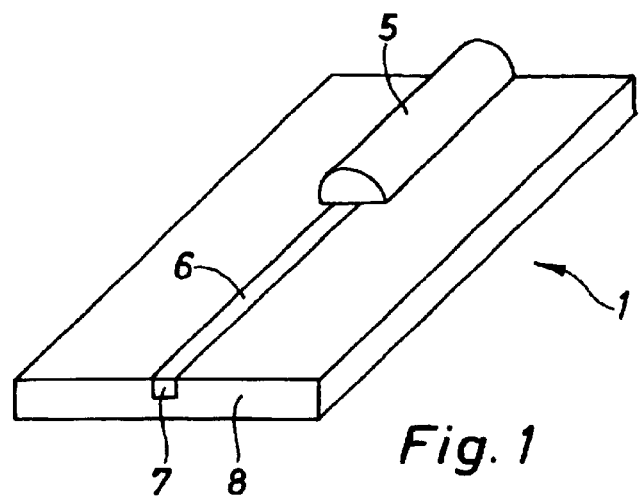
FIG. 1 shows a diagrammatic illustration of a circuit board with a waveguide structure according to the invention according to a preferred form of performance in top view.
Figure 2:
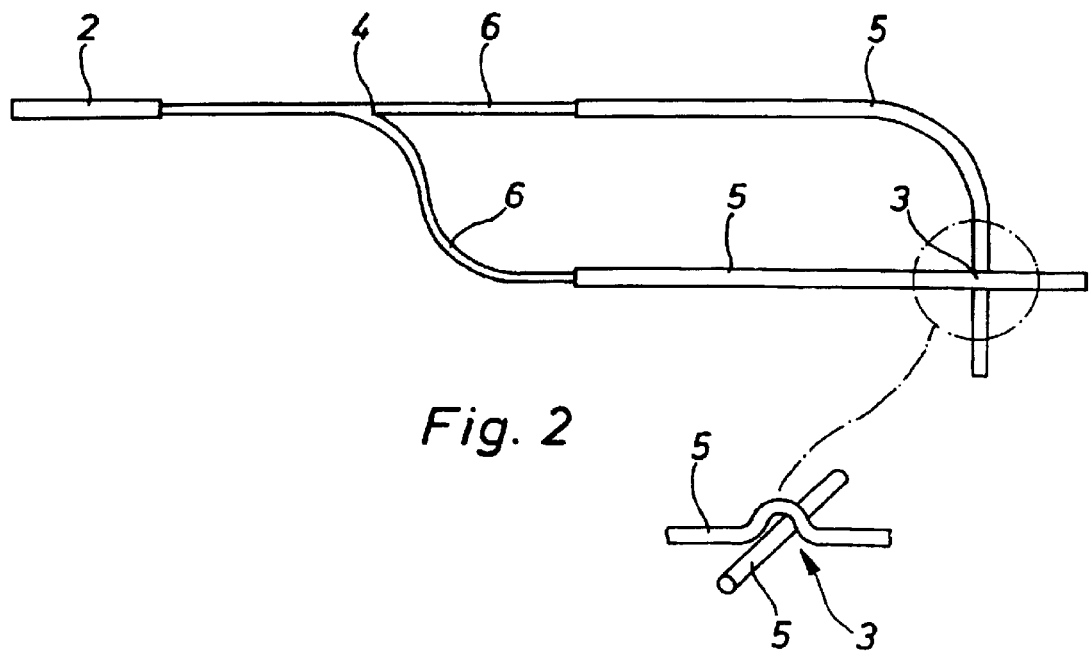
FIG. 2 shows the circuit board from FIG. 1 in section.

FIG. 1 shows in diagrammatic form a circuit board 1 with an optical waveguide structure according to the invention. The waveguide structure is formed on the circuit board 1. It comprises lines 2, crossings 3 and branchings 4 (if the light is flowing through the optical waveguide from left to right). If the light is flowing in the opposite direction through the waveguide, reference symbol 4 denotes a connection.

In the area of the lines 2 and crossings 3, the optical waveguide structure is formed as glass fibers. It would likewise be conceivable to form the optical waveguide structure in this area as plastic fibers. In the area of the branchings/connections 4, the optical waveguide structure is formed by contrast as a planar waveguide 6. The glass and plastic fibers 5 have the advantage that they exhibit low optical attenuation, that scattering or crosstalk of light from a first waveguide to a second crossing waveguide does not occur in the area of the crossings 3 and that additional attenuation does not occur in the area of the crossings 3. The planar waveguides 6 for their part have the advantage that they facilitate an extremely flexible arrangement of the waveguide structure, in particular branchings and/or connections 4. In combination with one another, the glass fibers 5 and planar waveguides 6 produce an optimal optical waveguide structure with low attenuation, no scatter in the area of the crossings 3 and a particularly high level of flexibility with regard to the course of the optical waveguide structure, in particular the optical fiber structure can include branchings and connections 4.

To produce the optical waveguide structure, troughs 7 are put into a substrate 8 by means of a hot-stamping process. Alternatively, it would also be conceivable to insert the troughs 7 into the substrate 8 by means of a photolithographic process. The troughs 7 correspond to the course of the future waveguide structure. The substrate 8 is formed as an organic film. First the glass fibers 5 are put into the troughs 7 in the area of the lines 2 and crossings 3 and glued. Then the areas of the troughs 7 still open, i.e. in the area of the branchings and/or connections 4, are filled with a waveguide material that has a higher refractive index than the material delimiting the troughs 7. In the present practical example, the material delimiting the troughs 7 corresponds to the substrate 8. However, it is conceivable that the walls of the troughs 7 are coated or lined with an additional special material. The waveguide material is formed as an optical polymer, which is put into the troughs 7 in a fluid state and cured by means of ultra-violet (UV) radiation.

It would also be conceivable to produce the planar waveguides 6 from thin glass, which has a thickness of a few micrometers (e.g. 60 μm) and the side walls of which are structured by an etching process in such a way that light rays inside the waveguide 6 are totally reflected on the side walls.

The dimensions of the troughs 7 are chosen so that the glass fibers 5 can be at least partly taken up in the area of the lines 2 and crossings 3. In the area of branchings and/or connections, the troughs 7 are formed dimensioned according to the dimensions of the planar waveguides 6.

The finished circuit board 1 can be part of an opto-electrical circuit board. The opto-electrical circuit board is produced by replacing at least one of the metallization levels of a multi-layer electrical circuit board by an optical layer with the optical waveguide structure according to the invention. The electrical layers of the opto-electrical circuit board are coupled to the waveguide structure via opto-electrical or electro-optical transducers. The opto-electrical circuit board is for example a board (e.g. motherboard) or an assembly of a computer.

The circuit board 1 according to the invention is particularly suitable for use in so-called backplane applications, where relatively large distances have to be bridged.

What is claimed is:

1. An optical waveguide structure having a branching section and a crossing section, the optical waveguide structure comprising:

a substrate having a first trough, a second trough and a third trough defined therein;

in the area of the crossing section, a first fiber partially inserted into the first trough and a second fiber partially inserted into the second trough, wherein the first trough has a width substantially equivalent to a width of a core of the first fiber, the second trough has a width substantially equivalent to a width of a core of the second fiber, and the first trough and the second trough are configured such that the first fiber crosses over the second fiber, and in the area of the branching section, a first planar waveguide formed within the first trough and a second planar waveguide formed within the second trough, wherein a coupling between the first planar waveguide and the first fiber resides within the first trough, a coupling between the second planar waveguide and the second fiber resides within the second trough, and the first planar waveguide and the second planar waveguide are configured to converge to form a third planar waveguide in the third trough.

2. A waveguide structure according to claim 1, wherein the first planar waveguide, the second planar waveguide and the third planar waveguide are comprised of an optical polymer.

3. A waveguide structure according to claim 1, wherein the substrate is formed as an organic film material.

4. A waveguide structure according to claim 1, wherein the first, the second and the third planar waveguides are formed by adding an optical polymer in a fluid state to the first trough, the second trough and the third trough and curing the optical polymer by means of ultra-violet radiation.

5. A waveguide structure according to claim 1, where the first, the second and the third planar waveguides comprise thin glass and are formed using an etching process.

6. A multi-layer opto-electrical circuit board, comprising at least one layer with an optical waveguide structure that includes:

a substrate having a first trough, a second trough and a third trough defined therein;

in the area of the crossing section, a first fiber partially inserted into the first trough and a second fiber partially inserted into the second trough, wherein the first trough has a width substantially equivalent to a width of a core of the first fiber, the second trough has a width substantially equivalent to a width of a core of the second fiber, and the first trough and the second trough are configured such that the first fiber crosses over the second fiber; and in the area of the branching section, a first planar waveguide formed within the first trough and a second planar waveguide formed within the second trough, wherein a coupling between the first planar waveguide and the first fiber resides within the first trough, a coupling between the second planar waveguide and the second fiber resides within the second trough, and the first planar waveguide and the second planar waveguide are configured to converge to form a third planar waveguide in the third trough.

7. A circuit board according to claim 6, wherein the electrical layers of the circuit board are coupled via opto-electrical or electro-optical transducers to the optical waveguide structure.

8. A method for manufacturing an optical waveguide structure having a crossing section and a branching section, the method comprising:

forming a substrate as an organic film material;

hot stamping a first trough, a second trough and a third trough into the substrate, wherein, the first trough has a width substantially equivalent to a core of a first fiber, the second trough has a width substantially equivalent to a core of a second fiber, in the area of the crossing section, the first trough and the second trough intersect, and, in the area of the branching section, the first trough and the second trough converge to form the third trough;

arranging the first fiber partially within the first trough and the second fiber partially within the second trough, wherein the first fiber crosses over the second fiber at the crossing section;

after the step of arranging, adding optical waveguide material to areas of the first trough, the second trough and the third trough not occupied by the first fiber or the second fiber; and curing the optical waveguide material with ultra-violet radiation.

9. A method according to claim 8, wherein the first and second fibers are glued in the troughs.

* * * * *